Patented Apr. 27, 1943

2,317,557

UNITED STATES PATENT OFFICE 2,317,557

RECOVERY OF NITRO COMPOUNDS FROM AQUEOUS ALCOHOLIC MIXTURES CONTAINING NITROMETHANE

Murray Senkus, Terre Haute, Ind., assignor to Commercial Solvents Corporation, Terre Haute, Ind., a corporation of Maryland No Drawing. Application February 14, 1941, Serial No. 378,940

1 Claim. (Cl. 260—635)

My invention relates to the recovery of nitro compounds from aqueous alcoholic mixtures containing nitromethane, and especially to the recovery of nitro compounds from such mixtures obtained in the distillation of the reaction products of the vapor phase nitration of alkanes.

Mixtures of water, aliphatic alcohols, and nitromethane, constitute complex combinations of azeotropic mixtures which are extremely difficult to separate. Such mixtures are encountered in the distillation of the reaction products of the vapor phase nitration of alkanes, and no satisfactory method has been found for recovering nitromethane from such mixtures. It has been impossible to separate such mixtures by the most careful fractionation with very efficient columns. Attempts have also been made to separate the nitromethane by solvent extraction, and by "salting out," but these methods have likewise failed.

I have now discovered that the nitromethane content of such mixtures can be recovered in a useful form, if the nitromethane is reacted with an aldehyde to form a nitrohydroxy compound, which can then be easily separated from the remainder of the mixture.

My procedure is adapted for the recovery of nitro compounds from any aqueous alcoholic mixtures containing nitromethane, but is especially useful in the recovery of nitro compounds from such mixtures obtained in distilling the reaction products of the vapor phase nitration of alkanes which contain more than 1 carbon atom, and particularly those containing from 2 to 4 carbon atoms.

The reaction products of the vapor phase nitration of alkanes by means of nitric acid contain, in addition to nitroalkanes, a certain amount of water of reaction, and considerable amounts of aldehydes, ketones, and alcohols. In the distillation of such mixtures, the aldehydes, ketones, and methyl alcohol may be distilled off first, after which there is obtained a complex mixture of water, alcohols, and nitromethane. If no additional water is added to the reaction products prior to distillation, the amount of this complex mixture will be limited by the amount of water of reaction which is present. However, the usual procedure in distilling these reaction products is to add an excess of water before distilling, thus effecting a steam distillation, which is preferable from the standpoint of reduced decomposition. In the steam distillation, the amount of the complex azeotropic mixture will be determined by the amount of alcohols present in the reaction products. The illustration which follows represents a typical steam distillation of the liquid reaction products from the nitration of propane in the vapor phase by means of nitric acid. One thousand parts by weight of water was added to one thousand parts by weight of crude liquid reaction products, and the mixture was distilled through an efficient column, making cuts at 75° C., 82° C., and 92° C. The composition and amounts of these fractions are shown below:

*Fraction I.  20–75° C.*

Acetaldehyde  
Propionaldehyde  
Acetone  
Methanol  
} 65 parts by weight

*Fraction II.  75–82° C.* i-Propanol  
n-Propanol  
Nitromethane  
Water  
} 133 parts by weight

*Fraction III.  82–92° C.*

Nitromethane  
Nitroethane  
1-nitropropane  
2-nitropropane  
Water  
} 1077 parts by weight Little difficulty is encountered in the separation of the components of Fractions I and III, but Fraction II constitutes an exceedingly complex combination of azeotropic mixtures which are substantially impossible to separate, even with the most efficient fractionation system. In accordance with my present invention, the nitromethane content of this fraction may be recovered in useful form by adding an aldehyde to the mixture in the presence of a basic condensation catalyst, thus transforming the nitromethane into a nitrohydroxy compound which may be easily separated from the remainder of the mixture.

Any aldehyde is suitable for this purpose, whether aliphatic, aromatic, saturated, or unsaturated. As examples of such aldehydes, there may be mentioned actealdehyde, butyraldehyde, acrolin, furfural, and benzaldehyde. In general, I prefer to employ saturated aldehydes, and especially the lower aliphatic saturated aldehydes. Formaldehyde is particularly suited for this purpose, and it may be used in the usual 40 per cent aqueous solution.

Any alkaline condensation catalyst may be employed to effect the reaction between the nitromethane and aldehyde. As examples of such catalysts, there may be mentioned sodium hydroxide, calcium hydroxide, potassium carbonate, and dibutylamine. In general, it is preferable to employ an alkaline catalyst which is readily soluble in the reaction mixture, but relatively insoluble alkaline materials may be used if the reaction mixture is agitated. Alkaline catalysts of different types, i. e., soluble, relatively insoluble, volatile, and non-volatile, may all have advantages for particular applications, depending upon the method to be employed in separating the resulting nitrohydroxy compound from the reaction mixture.

Any suitable procedure may be employed for effecting the reaction between the nitromethane and aldehyde to form the nitrohydroxy compound. Suitable procedures are described in U. S. Patents 2,135,444, and 2,139,120. In following the method of these patents in carrying out the present invention, the alkaline catalyst is added to the aqueous alcoholic mixture containing nitromethane, and the aldehyde is then slowly introduced into this mixture, preferably with agitation. Amounts of catalysts ranging from 0.05% to 1.0%, based on the total weight of the reaction mixture, may suitably be employed. The temperature may be maintained between 20° C. and 50° C., but is preferably maintained at 30–35° C. For optimum conversion of the nitromethane to nitrohydroxy compound, the reaction mixture should be allowed to stand for a number of hours, and preferably from 1 to 3 days, at the reaction temperature.

I generally prefer to employ an excess of aldehyde over that theoretically required for complete reaction with nitromethane. However, if it is desired to form a reaction product from nitromethane and a lower molar proportion of aldehyde, the theoretical amount of aldehyde required for the desired reaction product may be employed. Thus, in the case of formaldehyde, 3 moles may react with 1 mole of nitromethane to form tris(hydroxymethyl)nitromethane. For this purpose, a considerable excess of formaldehyde over the theoretical 3 moles is desirably employed. In general, it is most satisfactory to utilize a considerable excess of any aldehyde, and to recover the nitromethane in the form of the product resulting from the maximum addition of aldehyde under the reaction conditions employed.

At the conclusion of the reaction, the alkaline catalyst is preferably neutralized accurately to a neutral salt, in order to prevent decomposition of the nitrohydroxy compounds during their separation from the reaction mixture. In the case of the alkaline earth metal hydroxides, the neutralization may be effected by means of an acid which will form an insoluble salt, and the resulting precipitate may then be separated from the reaction mixture prior to recovering the nitrohydroxy compound. Depending upon the nature of the nitrohydroxy compound which is produced, such compound may be recovered by standard crystallization or distillation procedures.

My invention may be further illustrated by the following specific example:

Example

A distillation fraction corresponding to Fraction II, described above, was obtained by steam distilling the crude liquid reaction products from the vapor phase nitration of propane, by means of nitric acid, and collecting the fraction distilling at 75–82° C. This fraction was found to have the following composition:

|  | Per cent by weight |
|---|---|
| Isopropyl alcohol | 25 |
| n-Propyl alcohol | 10 |
| Nitromethane | 38 |
| Water | 27 |

To one thousand parts by weight of this mixture there was added approximately nine parts by weight of sodium hydroxide, in the form of a 20% aqueous solution. To this mixture there was slowly added, with agitation, twelve hundred and twenty parts by weight of formaldehyde, in the form of a 40% aqueous solution. The reaction temperature was maintained at approximately 30° C. during the introduction of the formaldehyde; and after all of the formaldehyde had been added, the mixture was allowed to stand at this temperature for 48 hours. The sodium hydroxide was then accurately neutralized with hydrochloric acid, and the solution was then evaporated to dryness under reduced pressure. The dry solid, which constituted tris(hydroxymethyl)nitromethane and a small amount of sodium chloride, was then recrystallized from n-butyl alcohol to obtain pure tris(hydroxymethyl)nitromethane. The purified material amounted to nine hundred and twenty-seven parts by weight, which constitutes a yield of 98.5% of the theoretical yield from the nitromethane content of the original mixture.

It is to be understood, of course, that the above example is merely illustrative, and does not limit the scope of my invention. My process is applicable to any other aqueous alcoholic mixtures containing nitromethane, and to the use of any other aldehydes for the transformation of the nitromethane into nitrohydroxy compounds. My invention is likewise not limited to any particular reaction conditions for effecting this reaction, or to any particular method of separating the resulting nitrohydroxy compound from the reaction mixture. In general, it may be said that any modifications of procedure, or the use of any equivalents which would occur to one skilled in the art, is included in the scope of my invention.

My invention now having been described, what I claim is:

A process of treating a fraction obtained in distilling liquid reaction products from the vapor phase nitration of propane, said fraction containing nitromethane, propyl alcohols, and water, which comprises incorporating an alkaline catalyst in said fraction, adding formaldehyde to the resulting mixture, effecting condensation of the nitromethane and formaldehyde to form tris(hydroxymethyl)nitromethane and separating the remainder of the reaction mixture from the nitrohydroxy compounds by evaporation, leaving the latter as a residue.

MURRAY SENKUS.